United States Patent Office 3,518,324
Patented June 30, 1970

3,518,324
OPTICAL COMPOSITIONS OF SILICONE RUBBER
Keith E. Polmanteer, Midland, Mich., assignor to Dow Corning Corporation, Midland, Mich., a corporation of Michigan
No Drawing. Filed Aug. 21, 1967, Ser. No. 661,816
Int. Cl. G08g 47/06; G02b 3/00
U.S. Cl. 260—825
10 Claims

ABSTRACT OF THE DISCLOSURE

Compositions containing improved physical properties are disclosed that are particularly useful in the manufacture of articles wherein optical clarity is desirable, and compositions consisting essentially of (1) 60 to 70 parts of a dimethylvinylsilyl endblocked copolymer consisting essentially of about 6 to 9 mol percent of phenylmethylsiloxane units, about 0.1 to 0.2 mol percent of vinylmethylsiloxane units, and the balance essentially dimethylsiloxane units, (2) 30 to 40 parts of a dimethylvinylsilyl endblocked copolymer consisting essentially of about 15 to 25 mol percent of methylvinylsiloxane units, about 4 to 6 mol percent of phenylmethylsiloxane units, and the balance essentially dimethylsiloxane units, there being a total of 100 parts of (1) and (2) in the composition, and (3) 2 to 10 parts, per 100 parts of (1) and (2), of a resin consisting essentially of trimethylsiloxane units, dimethylvinylsiloxane units and $SiO_{4/2}$ units, the ratio of the sum of the trimethylsiloxane units and dimethylvinylsiloxane units to the $SiO_{4/2}$ units in the resin being in the range of 0.6–1.2:1, at least (1) and (2) being free of materials having molecular weights of less than about 5000, all said parts being on a weight basis. These compositions are useful, for example, as interlayers in safety glass, in the preparation of pharmaceutical equipment, in the preparation of volumetric apparatus and in the preparation of lenses, especially contact lenses.

In recent years silicone rubber has been suggested as a substitute for methylmethacrylate and other plastics in the preparation of contact lenses and other optical materials. Illustrative of such disclosures are U.S. Pats. 3,036,985 and 3,228,741 and British Pats. 927,202 and 1,040,408 the latter British patent corresponding to U.S. Pat. 3,341,490. Generally speaking, the silicone rubbers have been slow to find acceptance in contact lenses because of their poor physical properties. It is therefore an object of this invention to provide a composition which upon curing becomes a silicone rubber that overcomes the deficiencies of the prior art materials. For example, it has been found that the compositions of this invention produce materials which have substantial increase in the modulus at no sacrifice of strength or tear resistance. It has also been found that the compositions of this invention exhibit substantialy reduced shrinkage upon processing as compared to similar prior art materials.

More specifically, this invention relates to a composition consisting essentially of (1) 60 to 70 parts of a dimethylvinylsilyl endblocked copolymer consisting essentially of about 6 to 9 mol percent of phenylmethylsiloxane units, about 0.1 to 0.2 mol percent of vinylmethylsiloxane units and the balance essentially dimethylsiloxane units, and (2) 30 to 40 parts of a dimethylvinylsilyl endblocked copolymer consisting essentially of about 15 to 25 mol percent of methylvinylsiloxane units, about 4 to 6 mol percent of phenylmethylsiloxane units and the balance essentially dimethylsiloxane units, there being a total of 100 parts of (1) and (2) in the composition, and (3) 2 to 10 parts, per 100 parts of (1) and (2), of a resin consisting essentially of trimethylsiloxane units, dimethylvinylsiloxane units and $SiO_{4/2}$ units, the ratio of the sum of the trimethylsiloxane units and dimethylvinylsiloxane units to the $SiO_{4/2}$ units in the resin being in the range of 0.1–1.2:1, at least (1) and (2) being free of materials having molecular weights of less than about 5,000, all said parts being on a weight basis.

This invention further relates to the vulcanized elastomeric products prepared by vulcanizing the compositions of this invention. Contact lenses prepared from the compositions are another facet of this invention. An especially preferred composition for making contact lenses is one which consists essentially of (1) about 65 parts of a dimethylvinyl endblocked copolymer consisting essentially of about 7.5 mol percent of phenylmethylsiloxane units, about 0.14 mol percent of vinylmethylsiloxane units and about 92.36 mol percent of dimethylsiloxane units, (2) about 35 parts of a dimethylvinylsilyl endblocked copolymer consisting essentially of about 20 mol percent methylvinylsiloxane units, about 5 mol percent phenylmethylsiloxane units and about 75 mol percent dimethylsiloxane units, and (3) about 3 to 7 parts of a resin consisting essentially of trimethylsiloxane untis, dimethylvinylsiloxane units and $SiO_{4/2}$ units, the ratio of the sum of the trimethylsiloxane units and dimethylvinylsiloxane units to the $SiO_{4/2}$ units in the resin being in the range of about 0.6–1.2:1, said parts being on a weight basis.

Other objects, advantages and aspects of this invention will be apparent from the following description, examples and claims.

Copolymers of the general type employed in the compositions of this invention as well as means for their preparation are well known to those skilled in the art. Copolymers used in preparing the compositions can be in the form of gums, fluids, or combinations of these. As pointed out above, at least copolymers (1) and (2) in the composition must be free of materials having molecular weights below 5,000. It is preferable that resin (3) also be free of these lower molecular weight materials. Copolymers prepared by conventional methods normally contain such lower molecular weight materials but can be freed of them by suitable techniques such as fractionation, exhaustive stripping, and extraction. These techniques are described in numerous places in the literature. However, the particularly preferred technique for removing lower molecular weight materials is by extractionation as described in U.S. patent application Ser. No. 539,746 now U.S. Pat. 3,440,264, filed Apr. 4, 1966 by Donald E. McVannel, the disclosure of which is incorporated herein by reference. In essence the process disclosed for removing lower molecular weight materials from the polymers involves the fractionation of the polymer in solvent through a permeable membrane.

The compositions of this invention can be vulcanized by conventional techniques well known to those skilled in the art. For example, the compositions can be vulcanized by irradiation or with peroxides employing the usual organic peroxide vulcanizing agents. Two organic peroxide vulcanizing agents that have been found to be particularly useful are dicumyl peroxide and tertiary butyl perbenzoate.

The mixing of the copolymers and resin to produce the composition of this invention can be done by any desired technique. Obviously, it is desirable that the technique employed should result in a reasonably uniform or homogenous composition in order that the best results are obtained. The particular mixing technique used will be determined by such factors as the equipment available, the nature of the copolymers being mixed (for example whether they are gums, fluids or both) and the ultimate use of the composition. For the preparation of contact lenses it is preferred at this time that the copolymers be mixed in the form of solvent solutions and that the resin be mixed either as a solvent solution or as a pure solid crystalline material.

So far as is known at this time, the proportions of the copolymers and resin in the composition as well as the proportions and types of siloxane units in each copolymer and the resin are critical, within the above limits, if one wishes to have products which are useful in the manufacture of articles having optical clarity and having improved properties disclosed above.

Now, in order that those skilled in the art may better understand how the present invention can be practiced, the following examples are given by way of illustration and not by way of limitation.

All parts and percents referred to herein are on a weight basis and all viscosities measured at 25° C. unless otherwise specified.

EXAMPLE

A composition was prepared which consisted essentially of (1) about 65 parts of a copolymer consisting essentially of about 7.5 mol percent phenylmethylsiloxane units, about 0.14 mol percent methylvinylsiloxane units and about 92.36 mol percent dimethylsiloxane units, (2) about 35 parts of a dimethylvinyl endblocked copolymer consisting essentially of about 20 mol percent methylvinylsiloxane units, about 5 mol percent phenylmethylsiloxane units and about 75 mol percent dimethylsiloxane units, (3) about 5 parts of a resin consisting essentially of trimethylsiloxane units, dimethylvinylsiloxane units, and $SiO_{4/2}$ units in which the ratio of the sum of the trimethylsiloxane units and dimethylvinylsiloxane units to the $SiO_{4/2}$ units is in the range of 0.6–1.2:1, and (4) 1 part of tertiary butyl perbenzoate.

The copolymers and resins after preparation were dissolved in hexane at about 25 percent solids and the resulting solutions filtered through diatomaceous earth. The filtered solutions were then individually extractionated employing the process of the aforementioned McVannel patent application with an extraction time of approximately 120 hours being employed. The composition was prepared by mixing the extractionated hexane solvent solutions of the two copolymers, while the resin was striped to remove the hexane after extractionation and the resulting neat crystalline polymer dissolved in the hexane solution of the two copolymers. This mixture was shaken until the resin had dissolved. The resulting hexane solution of the two copolymers and the resin was then filtered and stripped to 100 percent solids with a Rinco high vacuum evaporator. Care was taken not to exceed 100° C. while stripping. The composition was recovered from the stripping flask and then the one part of the tertiary butyl perbenzoate was mixed in thoroughly using a wide spatula in a wide flat dish on a commercial "clean bench." The composition was then put in a Semco tube container to keep it clean. The air was removed by centrifuging the tube using a water jacket to equalize the pressure on the tube, thus eliminating the possibility of breaking the tube.

Test samples of the silicone rubber were prepared for evaluation as follows. Some of the test material prepared above was placed in a 4″ x 4″ by 20 mil chase and vulcanized for 15 minutes at 160° C. at about 2000 p.s.i. Clear Teflon sheeting was used as a surface to provide an optically smooth film. The cured elastomer was then post cured for two hours at 150° C. and then after cooling to room temperature was extracted for six hours in boiling hexane. This procedure simulated that which would be employed if the composition were used to make a contact lens. The physical properties of the resulting elastomer were then evaluated using a table model Instron with a cross head travel rate of 2 inches per minute and chart speed of 10 inches per minute. This facilitated identifying the 5, 10 and 15% extensions to read the secant modulus values at these strain levels. The samples were extended to the breaking point so that both tensile and elongation at break could also be recorded. The B load cell was used in this work and was calibrated to give 100 gram full scale reading at a range setting of 1.

For purposes of comparison a second composition was prepared which was identical to the above composition with the exceptions that the copolymers were not extractionated and that instead of the resin 5 parts of a trimethylsilyl treated silica filler was employed. The results of the phyiscal evaluations are set forth in the table below.

| Composition | Secant modulus in p.s.i. at— | | | Tensile strength (p.s.i.) | Elongation percent |
|---|---|---|---|---|---|
| | 5% | 10% | 15% | | |
| Invention | 20 | 39 | 58 | 198 | 44 |
| Comparative | 11 | 20 | 30 | 154 | 61 |

That which is claimed is:

1. A composition consisting essentially of (1) 60 to 70 parts of a dimethylvinylsilyl endblocked copolymer consisting essentially of about 6 to 9 mol percent of phenylmethylsiloxane units, about 0.1 to 0.2 mol percent of vinylmethylsiloxane units, and the balance essentially dimethylsiloxane units, (2) 30 to 40 parts of a dimethylvinylsilyl endblocked copolymer consisting essentially of about 15 to 25 mol percent of methylvinylsiloxane units, about 4 to 6 mol percent of phenylmethylsiloxane units, and the balance essentially dimethylsiloxane units, there being a total of 100 parts of (1) and (2) in the composition, and (3) 2 to 10 parts, per 100 parts of (1) and (2), of a resin consisting essentially of trimethylsiloxane units, dimethylvniylsiloxane units and $SiO_{4/2}$ units, the ratio of the sum of the trimethylsiloxane units and dimethylvinylsiloxane units to the $SiO_{4/2}$ units in the resin being in the arnge of 0.6–1.2:1, at least (1) and (2) being free of materials having molecular weights of less than about 5000, all said parts being on a weight basis.

2. The composition of claim 1 which also contains, (4) an organic peroxide vulcanizing agent.

3. The vulcanized elastomeric composition produced by vulcanizing the composition of claim 1.

4. A contact lens prepared by vulcanizing the composition of claim 2.

5. The composition of claim 2 wherein (1) is about 65 parts of a dimethylvinyl endblocked copolymer consisting essentially of about 7.5 mol percent phenylmethylsiloxane units, about 0.14 mol percent of vinylmethylsiloxane units, and about 92.36 mol percent dimethyl siloxane units, (2) is about 35 parts of a dimethylvinylsilyl endblocked copolymer consisting essentially of about 20 mol percent methylvinylsiloxane units, about 5 mol percent phenylmethylsiloxane units and about 75 mol percent dimethylsiloxane units, (3) is about 3 to 7 parts of the resin, and (4) is about 0.5 to 2.5 parts of the vulcanizing agent.

6. The composition of claim 5 wherein the vulcanizing agent is dicumyl peroxide.

7. The composition of claim 5 wherein the vulcanizing agent is tertiary butyl perbenzoate.

8. The vulcanized elastomeric composition produced by vulcanizing the composition of claim 5.

9. A contact lens prepared by vulcanizing the composition of claim 5.

10. The composition of claim 1 wherein (1), (2) and (3) are all free of materials having molecular weights of less than about 5000.

References Cited

UNITED STATES PATENTS

| 3,284,406 | 11/1966 | Nelson | 260—825 |
| 3,341,490 | 9/1967 | Burdick et al. | 260—825 |

SAMUEL H. BLECH, Primary Examiner

U.S. Cl. X.R.

260—33.6, 46.5; 350—175